United States Patent

[11] 3,618,599

[72] Inventor Leroy E. Beightol
 Los Angeles, Calif.
[21] Appl. No. 847,433
[22] Filed Aug. 4, 1969
[45] Patented Nov. 9, 1971
[73] Assignee Merck & Co., Inc.
 Rahway, N.J.

[54] ORTHOPEDIC DEVICE HAVING A RESIN CURABLE BY ULTRASONIC ENERGY
 9 Claims, No Drawings

[52] U.S. Cl.......................................................... 128/90, 260/2, 260/75
[51] Int. Cl............................................................ A61f 5/04
[50] Field of Search.............................................. 128/90, 24 A; 260/75, 2; 204/159.19, 159.14; 264/4

[56] References Cited
UNITED STATES PATENTS
3,421,501  1/1969  Beightol...................... 128/90

Primary Examiner—Richard A. Gaudet
Assistant Examiner—J. Yasko
Attorney—Finkelstein & Mueth ABSTRACT: The present invention provides a novel method for the application of an orthopedic cast to a body member which comprises enclosing said member in an ultrasonic energy curable polymer impregnated, woven or nonwoven fabric, and curing said resin by exposure to ultrasonic energy to form a hard, lightweight, physiologically inert integral porous cast.

ORTHOPEDIC DEVICE HAVING A RESIN CURABLE BY ULTRASONIC ENERGY

BACKGROUND OF THE INVENTION

The present invention pertains to the application of orthopedic devices, and more particularly to the application of orthopedic casts formed of plastic materials without the need for the application of heat or any external energy.

It has been recognized that the preparation and application of orthopedic casts for the use in the treatment of bone fractures or other conditions requiring immobilization of body members may be advantageously formed from plastic or reinforced plastic materials. The advantages of plastic casts over the more common materials such as plaster of paris are manifold. In general, the plastic cast is impervious to water, lightweight, characterized by a high strength-to-weight ratio, and substantially transparent to X-rays thus, permitting X-ray study of the member after placement in the plastic cast. Previously, however, the use of plastic materials for orthopedic casts has been limited because of the difficulty of applying the plastic material to the body member. The plastic casts are generally formed with a plastic-impregnated fabric or cloth which is applied to the body member while the plastic is in a liquid or semiliquid form. More recently, I have found that orthopedic casts can be made from bandage materials which are impregnated with ultraviolet light curable resins. This discovery overcomes the problems associated with wet bandages. I have now discovered a dry bandage which can be cured in place on the body member simply by exposure to ultrasonic energy and which does not require the use of ultraviolet light.

Accordingly, it is a principal object of this invention to provide for the application of orthopedic casts formed of lightweight plastic materials without the need for the use of heat, ultraviolet light, moisture or oxygen.

A further object of this invention is to provide for the application of orthopedic casts formed of lightweight plastic wherein the hardening or setting of the plastic is accomplished by exposure to ultrasonic energy.

These and other objects and advantages of the invention will become apparent from the more detailed description which follows.

SUMMARY OF THE INVENTION

Briefly, the present invention provides a novel method for the application of an orthopedic cast to a body member which comprises enclosing said member in an ultrasonic energy curable polymer or resin system impregnated, woven or nonwoven fabric, and curing said resin by exposure to ultrasonic energy to form a hard, lightweight, physiologically inert integral porous cast.

DESCRIPTION OF PREFERRED EMBODIMENTS

The resin may be applied to the fabric by a variety of techniques. For example, the fabric may be simply dipped in a polymer solution and thereafter permitted to dry in an inert atmosphere prior to being wrapped in airtight packages or containers. The fabric itself may be any fibrous material capable of being impregnated by the polymer. In this respect, the term "impregnate" is used to describe a condition in which the polymer is thoroughly intermingled with and in surrounding relation to the threads or fibers of the fabric and does not necessarily indicate that the plastic material is to any extent absorbed by the fibers themselves. Generally, the fabric has a relatively open, knit structure, and the polymer solution will flow into the spaces between the individual fibers of the fabric but incompletely fill the spaces. In this way, when the polymer becomes rigidly bonded to the fabric upon hardening, there is formed in the orthopedic device a plurality of openings or pores which permit a flow of cooling and drying air through the cast. These pores improve significantly the comfortability of the device since the enclosed body member can be easily washed free of accumulated perspiration and dirt, and then dried simply by the passage of time. In addition, since the device "breathes", there is in the first place less accumulation of perspiration on the enclosed body member.

The fabric itself is preferably made of cotton, synthetic fiber, or fiber glass. However, the particular fabric selected will depend upon the particular application, and accordingly this invention is not limited to any particular choice of fabric material.

The present invention is not limited to any specific materials used in making the cast, and thus polymer material may be of any ultrasonic energy curable material. These materials have the advantage in that the initiation of cure does not depend upon elevated temperature. Thus, many polymers previously unsuitable in the preparation of orthopedic devices are used in the practice of this invention. While the use of accelerators and/or catalysts is not required, these materials generally are used in certain formulations in order to speed the curing of the resin in the presence of air. In any event, the ultrasonic energy curable resins of this invention will quickly form a rigid and/or hard, lightweight material at room temperature, thereby avoiding the need for the application of heat thereto and without producing high, body-irritating temperatures.

The ultrasonic energy-cured systems used to impregnate the fabric may be any curable resin system which is curable at or around room temperature up to about 150° F. Basically, in the present preferred embodiment, the resin in a curable state is mixed with catalyst encapsulated in shells or microballons which are shatterable by ultrasonic energy. The best known shells are glass microspheres which are known to those skilled in the art. However, encapsulation with many different types of brittle shells or outer coatings is well known in the art, and these various procedures need not be described in any detail in this patent. The curable resin may be, for example, an epoxy resin in which case the catalyst would be a tertiary amine such as triethyl amine. Other suitable resin systems include almost any of the unsaturated commercial polyesters of a nonaniline type, and the monomer correctant of any compatible terminal ethylenic unsaturated monomer including vinyls, acrylics, allyls, and the like, such as styrene, methyl methacrylate and triallyl cyanurate. The monomer is generally used in an amount of from about 5 to 50 percent by weight of the polyester.

The fabric material which is impregnated with the curable polymer system containing encapsulated catalyst may be in the form of a continuous sheet, or of short or long strips. For example, the impregnated fiber may be about 2-inches wide and after impregnation rolled up until it is desired to use the same in wrapping a body member. In applying the rolled up material to the body member, the strip is wrapped around the member in an advancing overlapping manner, advancing about 1 inch per turn. When the member has been completely wrapped in the impregnated fabric, the member is then exposed for a short time on the order of from a few seconds to one-half hour to ultrasonic energy. The ultrasonic energy is typically supplied by an ultrasonic transducer.

The examples presented herein serve solely to illustrate the invention. Accordingly, the examples should not be regarded as limiting the invention in any way. In the examples, the parts and percentages are by weight unless otherwise indicated.

EXAMPLE 1 - (Resin A)

A typical general purpose rigid polyester was made as follows:

An alkyd kettle equipped with heating means, turbine type agitation, gas sparger inlet, reflux condenser and temperature controls was charged with

|  | Parts |
| --- | --- |
| Phthalic anhydride | 35.07 |
| Propylene glycol | 41.71 | and heated at 450° F. until an acid number of 15 was reached. Maleic anhydride 23.22 parts was then added in small increments, and by cooling a temperature was maintained at 400°

F. in the kettle, and held for 4 hours. The temperature was then dropped to 200° F.

|  | Parts |
|---|---|
| Styrene monomer | 45.74 |
| Para tertiary butyl catechol | 0.13 | were mixed and added to the contents of the kettle with good agitation.

Benzoyl peroxide —1.0 part was then added. Catalyst encapsulated in glass microballons.

EXAMPLE 2 -(Resin B)

A flexible type of polyester was made in a similar manner to example 1 comprising the following:

|  | Parts |
|---|---|
| Phthalic anhydride | 23.65 |
| Adipic acid | 5.81 |
| Maleic anhydride | 19.64 |
| Diethylene glycol | 50.90 |
| After the reaction was completed and cooled |  |
|  | Parts |
| Triallyl cyanurate monomer | 46.50 |
| Hydroquinone | 0.04 | was mixed and blended to the charge.

Benzoyl peroxide —0.5 part was then added. Catalyst encapsulated in glass microballons.

EXAMPLE 3

A 50/50 blend was made of Resin A example 1 and Resin B example 2 and cured by the light of a mercury arc lamp in tensile specimen molds. The following data was obtained from the castings:

| Tensile strength | p.s.i. | 4,100 |
|---|---|---|
| Flexural strength | p.s.i. | 8,000 |
| Percent elongation |  | 6.8 |

EXAMPLE 4

A strip of 5.73 ounce fiber glass cloth with a construction 57×30 0.0055 inch thick was saturated with Resin A and passed through rolls until excess resin was removed. The resin pickup was about 40 percent by weight. The impregnated cloth was wrapped around a collapsible mandrel and exposed to ultrasonic energy from a distance of 12 inches. After a few minutes the transducer was shut off and the resin-impregnated glass examined. It was found to be a rigid self-supporting structure, and without noticeable heat content. No tackiness was apparent and upon removal of the mandrel the tube was capable of supporting considerable weight in spite of the light weight.

EXAMPLE 5

A 4-ounce woven fiber glass tape 2 inches wide was impregnated with a solution of the Resin B in acetone. The ribbon was passed through rolls and through a hot air bath to remove the solvent. The slightly tacky tape was then rolled around a cylindrical core with polyethylene tape interposed between each layer as a separation. The wound core was then placed in an impervious plastic bag and stored at 30° F. for 2 months. The tape was then allowed to come to room temperature and wound spirally on a flexible mandrel.

Exposure to ultrasonic energy from a transducer at a distance of 8 inches produced a rigid structure which was conformed to the flexible shape. Examination showed the plastic shape to be rigid, tack free, lightweight, and very strong.

An orthopedic test subject was chosen, and the forearm prepared by placing a polypropylene stockinette sheath around the arm. The preimpregnated glass bandage of example 5 was then wrapped over the covered areas of the arm to form a sheath with an average thickness of 0.100 inch. Within several minutes after exposure to ultrasonic energy the surface was hard, rigid, porous, and very light in weight. No discomfort was reported by the test subject either from heat or fumes. A radiograph taken through the cast showed no impediment to X-rays due to the cast, and showed that X-ray examination was practical with the cast in place.

The technique of this invention provides an orthopedic device to which may be attached, for example, bolts, clamps, or any other anchor or holding attachment, threaded or unthreaded. These attachments may be used for pulling, lifting or suspending, as in traction or for therapy purposes. The devices of my invention are applicable not only to members of the human body, but also to animal members.

The casts can be removed by any of the conventional means used for removal of plaster casts, i.e., a vibratory saw.

Having fully described the invention, it is intended that it be limited only by the lawful scope of the appended claims.

I claim:

1. A novel method for the application of an orthopedic device to a body member which comprises enclosing said member in an essentially dry ultrasonic energy curable resin system impregnated, flexible fabric, said system including encapsulated catalyst releaseable upon exposure to ultrasonic energy; and curing said resin by exposure to ultrasonic energy to form a hard, lightweight, physiologically inert integral porous device.

2. A method for the application of an orthopedic device to a body member which comprises enclosing said member in an essentially dry ultrasonic energy curable resin system impregnated, flexible fabric, said system including encapsulated catalyst releaseable upon exposure to ultrasonic energy; and curing said resin at room temperature by exposure to ultrasonic energy to form a hard, lightweight, physiologically inert integral porous device.

3. A novel method for the application of an orthopedic cast to a body member which comprises enclosing said member in an essentially dry ultrasonic energy curable polyester resin system impregnated, flexible fabric, said system including encapsulated catalyst releaseable upon exposure to ultrasonic energy; and curing said polyester resin at room temperature by exposure to ultrasonic energy to form a hard, lightweight, physiologically inert integral porous device.

4. A novel method for the application of an orthopedic cast to a body member which comprises wrapping said member in a long strip of an essentially dry ultrasonic energy curable resin system impregnated, flexible fabric, said system including encapsulated catalyst releaseable upon exposure to ultrasonic energy; and curing said resin at room temperature by exposure to ultrasonic energy to form a hard, lightweight, physiologically inert integral porous cast.

5. A novel method for the application of an orthopedic cast to a body member which comprises wrapping said member in a long strip of an essentially dry ultrasonic energy curable resin system impregnated, flexible glass fabric, said system including encapsulated catalyst releaseable upon exposure to ultrasonic energy; and curing said resin at room temperature by exposure to ultrasonic energy to form a hard, lightweight, physiologically inert integral porous cast.

6. The method of claim 4 wherein said body member is covered with a stockinette prior to being wrapped in said strip.

7. The method of claim 1 wherein the curable resin system contains curing catalyst encapsulated by an ultrasonic energy shatterable shell.

8. An essentially dry storage stable flexible resin-impregnated fabric adapted to wrap a body member, said fabric being in the form of a long narrow bondage strip, said resin comprising an ultrasonic energy curable resin system capable of becoming hard and rigid at room temperature upon exposure to ultrasonic energy, said system including encapsulated catalyst releaseable upon exposure to ultrasonic energy.

9. The fabric of claim 8 wherein the curable resin system contains curing catalyst encapsulated by an ultrasonic energy shatterable shell.